United States Patent [19]
Rallison et al.

[11] Patent Number: 6,097,543
[45] Date of Patent: *Aug. 1, 2000

[54] PERSONAL VISUAL DISPLAY

[75] Inventors: Richard Dennis Rallison, Paradise, Utah; C. Gregory Amadon; Wolfgang Adam Mack, Jr., both of Seattle, Wash.; Arlie R. Conner, Tualatan, Oreg.

[73] Assignee: i-O Display Systems LLC, Menlo Park, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/416,840
[22] PCT Filed: Aug. 31, 1994
[86] PCT No.: PCT/US94/09820
  § 371 Date: Apr. 21, 1995
  § 102(e) Date: Apr. 21, 1995
[87] PCT Pub. No.: WO95/21396
  PCT Pub. Date: Aug. 10, 1995

Related U.S. Application Data

[63] Continuation-in-part of application No. 08/307,669, filed as application No. PCT/US94/01390, Feb. 7, 1994, Pat. No. 5,864,326, which is a continuation-in-part of application No. 08/150,966, Nov. 12, 1993, abandoned, which is a division of application No. 07/832,237, Feb. 7, 1992, Pat. No. 5,303,085.

[51] Int. Cl.⁷ .................................................. G02B 27/14
[52] U.S. Cl. ........................................... 359/633; 359/630
[58] Field of Search ..................................... 359/630, 631, 359/632, 633, 583, 589, 629; 349/11

[56] References Cited

U.S. PATENT DOCUMENTS

| | | | |
|---|---|---|---|
| D. 300,476 | 3/1989 | Sestak | D29/18 |
| D. 301,644 | 6/1989 | Sestak | D29/18 |
| D. 334,557 | 4/1993 | Hunter et al. | D14/114 |
| D. 334,742 | 4/1993 | Hunter et al. | D14/113 |
| D. 337,320 | 7/1993 | Hunter et al. | D14/113 |
| D. 338,514 | 8/1993 | Holmes | D21/240 |
| 2,411,933 | 12/1946 | Morley et al. | 2/14 |
| 2,955,156 | 10/1960 | Heilig | 178/6.5 |
| 2,958,258 | 11/1960 | Kelly | 88/24 |
| 3,043,910 | 7/1962 | Hicks | 178/7.85 |
| 3,212,102 | 10/1965 | Müller | 2/12 |
| 3,589,795 | 6/1971 | Miyazaki et al. | 350/96 B |
| 3,614,314 | 10/1971 | Rossire | 178/7.88 |

(List continued on next page.)

FOREIGN PATENT DOCUMENTS

| | | |
|---|---|---|
| 0 288 365 | 10/1988 | European Pat. Off. ........ G02B 27/00 |
| 91309108 | 10/1991 | European Pat. Off. . |

(List continued on next page.)

OTHER PUBLICATIONS

Antonoff, "Real estate is cheap here, but the place you'd most want to visit are still under construction", *Popular Science*, Jun. 1993, pp. 83, 86, 124–125.

(List continued on next page.)

*Primary Examiner*—Georgia Epps
*Assistant Examiner*—Jordan M. Schwartz
*Attorney, Agent, or Firm*—Sheridan Ross P.C.

[57] ABSTRACT

A visual display device is provided for delivering a generated image, preferably combinable with environment light, to the eye of a user. Light from an image generator such as a CRT, LED or LCD is reflected from a fold mirror away from a user's eye towards a combiner. The image is reflected from the combiner and magnified, optionally combined with light from the environment and passes back through the fold mirror towards the eye of the user. In one embodiment, an optical element such as a meniscus lens or PCX lens is used to present the user with a substantially flat focal field and/or a Fresnel lens or diffractive optical element is used to aim rays from the image to the field curvature corrective lens in order to maintain maximum contrast.

14 Claims, 5 Drawing Sheets

U.S. PATENT DOCUMENTS

| | | | |
|---|---|---|---|
| 3,629,870 | 12/1971 | Paisley | 2/15 |
| 3,874,783 | 4/1975 | Cole | 350/96 B |
| 3,915,548 | 10/1975 | Opittek et al. | 350/3.5 |
| 3,923,370 | 12/1975 | Mostrom | 350/55 |
| 3,940,204 | 2/1976 | Withrington | 350/3.5 |
| 4,021,862 | 5/1977 | Glasser et al. | 2/431 |
| 4,026,641 | 5/1977 | Bosserman et al. | 350/298 |
| 4,028,725 | 6/1977 | Lewis | 358/103 |
| 4,042,957 | 8/1977 | Ellis | 358/109 |
| 4,048,653 | 9/1977 | Spooner | 358/104 |
| 4,257,062 | 3/1981 | Meredith | 358/81 |
| 4,269,476 | 5/1981 | Gauthier et al. | 350/174 |
| 4,310,849 | 1/1982 | Glass | 358/88 |
| 4,322,135 | 3/1982 | Freeman | 350/410 |
| 4,348,185 | 9/1982 | Breglia et al. | 434/43 |
| 4,361,384 | 11/1982 | Bosserman | 350/174 |
| 4,385,803 | 5/1983 | Ellis | 350/174 |
| 4,395,731 | 7/1983 | Schoolman | 358/88 |
| 4,398,799 | 8/1983 | Swift | 350/174 |
| 4,437,113 | 3/1984 | Lee et al. | 358/93 |
| 4,439,157 | 3/1984 | Breglia et al. | 434/40 |
| 4,446,480 | 5/1984 | Breglia et al. | 358/104 |
| 4,465,347 | 8/1984 | Task et al. | 350/538 |
| 4,468,101 | 8/1984 | Ellis | 350/538 |
| 4,550,984 | 11/1985 | Reymond | 350/404 |
| 4,559,555 | 12/1985 | Schoolman | 358/88 |
| 4,561,723 | 12/1985 | Hamano et al. | 350/331 R |
| 4,571,628 | 2/1986 | Thornton | 358/224 |
| 4,630,321 | 12/1986 | Sagemuehl et al. | 2/426 |
| 4,633,324 | 12/1986 | Giulie | 358/255 |
| 4,636,866 | 1/1987 | Hattori | 358/236 |
| 4,641,931 | 2/1987 | Loy | 350/538 |
| 4,651,201 | 3/1987 | Schoolman | 358/98 |
| 4,652,870 | 3/1987 | Steward | 340/705 |
| 4,695,129 | 9/1987 | Faessen et al. | 350/96.25 |
| 4,703,522 | 11/1987 | Schürle et al. | 2/432 |
| 4,706,117 | 11/1987 | Schoolman | 358/88 |
| 4,711,512 | 12/1987 | Upatnieks | 350/3.7 |
| 4,722,601 | 2/1988 | McFarlane | 356/152 |
| 4,726,075 | 2/1988 | Hinrichs | 2/13 |
| 4,737,972 | 4/1988 | Schoolman | 378/41 |
| 4,743,200 | 5/1988 | Welch et al. | 434/43 |
| 4,751,746 | 6/1988 | Rustin | 2/13 |
| 4,753,514 | 6/1988 | Kubik | 350/174 |
| 4,757,714 | 7/1988 | Purdy et al. | 73/597 |
| 4,761,056 | 8/1988 | Evans et al. | 350/174 |
| 4,763,990 | 8/1988 | Wood | 350/320 |
| 4,775,217 | 10/1988 | Ellis | 350/538 |
| 4,784,468 | 11/1988 | Tierney | 350/276 R |
| 4,785,481 | 11/1988 | Palmer et al. | 2/436 |
| 4,786,966 | 11/1988 | Hanson et al. | 358/108 |
| 4,796,987 | 1/1989 | Linden | 351/158 |
| 4,797,736 | 1/1989 | Kloots et al. | 358/93 |
| 4,799,765 | 1/1989 | Ferrer | 350/174 |
| 4,805,988 | 2/1989 | Dones | 350/137 |
| 4,806,011 | 2/1989 | Bettinger | 351/158 |
| 4,807,202 | 2/1989 | Cherri et al. | 367/129 |
| 4,826,287 | 5/1989 | Cook et al. | 350/174 |
| 4,853,764 | 8/1989 | Sutter | 358/3 |
| 4,859,030 | 8/1989 | Rotier | 350/174 |
| 4,859,031 | 8/1989 | Berman et al. | 350/174 |
| 4,863,242 | 9/1989 | Correa | 350/276 R |
| 4,864,190 | 9/1989 | Orr | 313/478 |
| 4,865,420 | 9/1989 | Schmidt | 350/276 R |
| 4,867,551 | 9/1989 | Perera | 351/158 |
| 4,868,930 | 9/1989 | Blackstone | 2/439 |
| 4,869,575 | 9/1989 | Kubik | 350/174 |
| 4,874,214 | 10/1989 | Cheysson et al. | 350/3.7 |
| 4,874,235 | 10/1989 | Webster | 351/201 |
| 4,884,137 | 11/1989 | Hanson et al. | 358/108 |
| 4,884,219 | 11/1989 | Waldren | 364/514 |
| 4,897,715 | 1/1990 | Beamon | 358/93 |
| 4,900,133 | 2/1990 | Berman | 350/346 |
| 4,902,083 | 2/1990 | Wells | 350/6.6 |
| 4,902,116 | 2/1990 | Ellis | 350/501 |
| 4,902,120 | 2/1990 | Weyer | 351/158 |
| 4,904,049 | 2/1990 | Hegg | 350/96.27 |
| 4,930,888 | 6/1990 | Freisleben et al. | 356/152 |
| 4,932,731 | 6/1990 | Suzuki et al. | 350/3.7 |
| 4,933,755 | 6/1990 | Dahl et al. | 358/88 |
| 4,934,773 | 6/1990 | Becker | 350/6.6 |
| 4,952,024 | 8/1990 | Gale | 350/143 |
| 4,961,625 | 10/1990 | Wood et al. | 350/174 |
| 4,961,626 | 10/1990 | Fournier et al. | 350/174 |
| 4,968,123 | 11/1990 | Fournier et al. | 350/538 |
| 4,969,714 | 11/1990 | Fournier et al. | 353/174 |
| 4,969,724 | 11/1990 | Ellis | 350/503 |
| 4,970,589 | 11/1990 | Hanson et al. | 358/108 |
| 4,982,278 | 1/1991 | Dahl et al. | 358/88 |
| 4,983,014 | 1/1991 | Nattermann | 350/96.24 |
| 4,984,179 | 1/1991 | Waldern | 364/514 |
| 4,993,790 | 2/1991 | Vick | 350/3.73 |
| 4,995,165 | 2/1991 | Daniels | 33/361 |
| 5,003,300 | 3/1991 | Wells | 340/705 |
| 5,005,213 | 4/1991 | Hanson et al. | 455/617 |
| 5,015,072 | 5/1991 | Howell | 350/276 R |
| 5,019,828 | 5/1991 | Schoolman | 342/457 |
| 5,034,809 | 7/1991 | Katoh | 358/88 |
| 5,035,473 | 7/1991 | Kuwayama et al. | 350/3.7 |
| 5,039,198 | 8/1991 | VanBeek | 385/117 |
| 5,046,827 | 9/1991 | Frost et al. | 359/54 |
| 5,050,966 | 9/1991 | Berman | 359/38 |
| 5,053,755 | 10/1991 | Smith et al. | 340/705 |
| 5,069,529 | 12/1991 | Takahashi | 359/601 |
| 5,081,542 | 1/1992 | Efron et al. | 359/41 |
| 5,089,903 | 2/1992 | Kuwayama et al. | 359/15 |
| 5,091,719 | 2/1992 | Beamon | 340/705 |
| 5,101,298 | 3/1992 | Lentz et al. | 359/612 |
| 5,115,345 | 5/1992 | Hobson et al. | 359/601 |
| 5,121,253 | 6/1992 | Waintroob | 359/601 |
| 5,123,726 | 6/1992 | Webster | 351/201 |
| 5,124,821 | 6/1992 | Antier et al. | 359/14 |
| 5,129,716 | 7/1992 | Holakovszky et al. | 351/50 |
| 5,130,794 | 7/1992 | Ritchey | 358/87 |
| 5,138,555 | 8/1992 | Albrecht | 364/424.06 |
| 5,146,623 | 9/1992 | Paysan et al. | 2/12 |
| 5,151,722 | 9/1992 | Massof et al. | 351/158 |
| 5,155,627 | 10/1992 | Keehn et al. | 359/609 |
| 5,162,828 | 11/1992 | Furness et al. | 353/122 |
| 5,162,928 | 11/1992 | Taniguchi et al. | 359/13 |
| 5,164,848 | 11/1992 | Firth et al. | 359/13 |
| 5,166,778 | 11/1992 | Beamon | 358/3 |
| 5,170,153 | 12/1992 | Migozzi et al. | 340/705 |
| 5,182,817 | 2/1993 | Branum | 2/439 |
| 5,184,231 | 2/1993 | Ellis | 359/13 |
| 5,189,512 | 2/1993 | Cameron et al. | 358/93 |
| 5,192,960 | 3/1993 | Komamura | 351/41 |
| 5,198,928 | 3/1993 | Chauvin | 359/465 |
| 5,198,930 | 3/1993 | Muratomi | 359/583 |
| 5,200,844 | 4/1993 | Suvada | 359/40 |
| 5,216,759 | 6/1993 | Hewitt et al. | 2/439 |
| 5,231,379 | 7/1993 | Wood et al. | 340/705 |
| 5,249,081 | 9/1993 | Rogers | 359/633 |
| 5,255,211 | 10/1993 | Redmond | 364/578 |
| 5,274,405 | 12/1993 | Webster | 351/158 |
| 5,274,501 | 12/1993 | Stroll | 359/613 |
| 5,276,471 | 1/1994 | Yamauchi et al. | 351/153 |
| 5,278,680 | 1/1994 | Karasawa et al. | 359/40 |
| 5,281,957 | 1/1994 | Schoolman | 345/8 |
| 5,293,271 | 3/1994 | Merritt et al. | 359/858 |
| 5,300,942 | 4/1994 | Dolgoff | 345/32 |
| 5,303,085 | 4/1994 | Rallison | 359/631 |

| | | | |
|---|---|---|---|
| 5,305,244 | 4/1994 | Newman et al. | 364/708.1 |
| 5,309,169 | 5/1994 | Lippert | 345/8 |
| 5,320,538 | 6/1994 | Baum | 434/307 |
| 5,321,416 | 6/1994 | Bassett et al. | 345/8 |
| 5,322,441 | 6/1994 | Lewis et al. | 434/307 |
| 5,323,174 | 6/1994 | Klapman et al. | 345/156 |
| 5,327,175 | 7/1994 | Kim | 348/526 |
| 5,331,149 | 7/1994 | Spitzer et al. | 250/221 |
| 5,334,991 | 8/1994 | Wells et al. | 345/8 |
| 5,335,299 | 8/1994 | Atkinson | 382/56 |
| 5,347,400 | 9/1994 | Hunter | 359/815 |
| 5,353,042 | 10/1994 | Klapman et al. | 345/156 |
| 5,357,372 | 10/1994 | Chen et al. | 359/637 |
| 5,373,857 | 12/1994 | Travers et al. | 128/782 |
| 5,383,053 | 1/1995 | Hegg et al. | 359/486 |
| 5,392,158 | 2/1995 | Tosaki | 359/633 |
| 5,408,346 | 4/1995 | Trissel et al. | 359/65 |
| 5,432,626 | 7/1995 | Sasuga et al. | 359/83 |
| 5,451,976 | 9/1995 | Ito | 345/8 |
| 5,486,841 | 1/1996 | Hara et al. | 345/8 |
| 5,526,184 | 6/1996 | Tokuhashi et al. | 359/630 |
| 5,528,262 | 6/1996 | McDowall et al. | 345/151 |
| 5,648,789 | 7/1997 | Beadles et al. | 359/630 |

FOREIGN PATENT DOCUMENTS

| | | | |
|---|---|---|---|
| 0 461 942 A1 | 12/1991 | European Pat. Off. | G09D 9/32 |
| 0 582 229 | 2/1994 | European Pat. Off. | G02B 27/00 |
| 2517916 | 6/1983 | France | H04N 9/54 |
| 2 609 778 | 7/1988 | France | F21K 2/00 |
| 224691 | 7/1910 | Germany . | |
| 2 009 798 | 9/1970 | Germany | G02B 17/00 |
| 3532730 | 3/1987 | Germany | A61B 1/04 |
| 3628458 | 2/1988 | Germany | H04N 1/20 |
| 4225589A1 | 2/1994 | Germany | G06F 9/00 |
| 59-117889 | 7/1984 | Japan | H04N 9/54 |
| 59-219092 | 12/1984 | Japan | H04N 9/54 |
| 62-272698 | 11/1987 | Japan . | |
| 63-82192 | 4/1988 | Japan . | |
| 63-177689 | 7/1988 | Japan . | |
| 1-61723 | 3/1989 | Japan . | |
| 5-46161 | 2/1993 | Japan | G09G 5/36 |
| 6-59217 | 3/1994 | Japan . | |
| 2 006 463 | 5/1979 | United Kingdom | G02B 27/10 |
| 2 143 948 | 2/1985 | United Kingdom | G01C 1/00 |
| 2266385A | 10/1993 | United Kingdom | G02B 23/10 |
| 2270775A | 3/1994 | United Kingdom | G02B 27/02 |
| 2 274 727 | 8/1994 | United Kingdom | G02B 27/00 |
| 2 279 201 | 12/1994 | United Kingdom | H04R 1/10 |
| 2 281 846 | 3/1995 | United Kingdom | A45F 3/00 |
| 2 287 551 | 9/1995 | United Kingdom | G02B 23/00 |
| 84/01680 | 4/1984 | WIPO | H04N 5/64 |
| WO 92/03756 | 3/1992 | WIPO | G02B 27/00 |
| 93/23783 | 11/1993 | WIPO . | |
| WO 94/11855 | 5/1994 | WIPO | G09G 3/02 |
| WO 94/14152 | 6/1994 | WIPO | G09G 3/02 |
| WO 94/24658 | 10/1994 | WIPO | G09G 3/02 |
| WO 95/10061 | 4/1995 | WIPO | G02B 26/10 |
| WO 95/10106 | 4/1995 | WIPO | G09G 3/02 |
| WO 95/21391 | 8/1995 | WIPO | G02B 5/30 |
| WO 95/21440 | 8/1995 | WIPO | G09G 3/02 |

OTHER PUBLICATIONS

Burley, et al. "A full–color wide–field–of–view holographic helmet–mounted display for pilot/vehicle interface development and human factors studies", SPIE, vol. 1290 Helmet–Mounted Displays II (1990), pp. 9–15.

Carr, "Is virtual Reality Virtually Here?", Training & Development, Oct. 1992, pp. 37–41.

Fischer et al., "Living in a Virtual World", BYTE, Jul. 1990, pp. 215–221.

Horn, "Seeing the invisible", U.S. News & World Report, Jan. 28, 1991.

James, "Goggles Brighten Dark Subway", The New York Times, Apr. 10, 1992.

Jones et al., "Evaluation of conformal and body–axis attitude information for spatial awareness", SPIE, vol. 1695, Helmet–Mounted Displays III (1992), pp. 146–153.

Starks, "stereoscopic video and the quest for virtual reality: an annotated bibliography of selected topics", SPIE, vol. 1457, Stereoscopic Displays and Applications II (1991), pp. 327–343.

Stewart, "Through the looking glass into an artificial world–via computer", Smithsonian, vol. 21, No. 10, Jan. 1991, pp. 36–45.

Foley, Interfaces for Advanced Computing, Scientific American, Oct. 1987, vol. 257, No. 4, pp. 126–135.

Krueger, Artificial Reality II, 1991 Addison–Wesley Publishing Company, Inc., pp. 66–82, 102–116, 130–149, 179–182, 237–239, 267–279.

Sutherland, "A head–mounted three dimensional display", Fall Joint Computer Conference, 1968, pp. 757–763.

Assenheim et al., "Large–Screen–Projection, Avionic, and Helmet–Mounted Displays", Proceedings, The International Society for Optical Engineering, Feb. 26–28, 1991, vol. 1456, p. 179–190.

Benton, "Practical Holography VIII", Proceedings, The International Society for Optical Engineering, Feb. 7–9, 1994, vol. 2176, p. 241–248.

Driscoll et al., Handbook of Optics, McGraw–Hill Book Company, 1978, p. 13–6.

Fischer, "Fundamentals and Optics for Head Mounted Displays", Photonics West '95, Feb. 4–10, 1995.

Rotier, "Optical Approaches to the Helmet Mounted Display", SPIE, 1989, vol. 1116, p. 1, 4–17.

"Survey of Head Mounted Displays", Real Time Graphics, Aug. 1994, vol. 3, No. 2, p. 1, 8–12.

VR News, Dec. 1994, vol. 3, Issue 10, p. 4, 8, 12.

"Airlines Weigh Benefits, Costs of At–Seat Video", Aviation week & Space Technology, Aug. 15, 1994, p. 44–45.

Pope, "Say ahhh! Videos help you relax", The Times–Picayune, Oct. 25, 1994, p. 1, A–6.

Farmer, "The right solution to the right problem . . . now", Comdex Daily, Nov. 15, 1994, p. 4.

Siggraph, Nikkei Electronics, Aug. 22, 1994, p. 13–14.

Virtual I/O, "i–glasses!", Twice CES Daily, Jan. 6, 1995, p. 30.

Virtual I/O, Specifications, Virtual Reality World, Nov./Dec. 1994, p. 11.

Virtual I/O, VR News, Aug./Sep. 1994, p. 17.

PERSONAL VISUAL DISPLAY

This application is a continuation-in-part of Ser. No. 08/307,669, filed Apr. 21, 1995, now U.S. Pat. No. 5,864,326 which is the U.S. National Phase of PCT/US94/01390, filed Feb. 7, 1994, for "DEPIXELATED VISUAL DISPLAY" and is further a continuation-in-part of Ser. No. 08/150,966 filed Nov. 12, 1993, now abandoned, for "OPTICALLY CORRECTED ELEMENT MOUNTED DISPLAY" which is a divisional of Ser. No. 07/832,237, filed Feb. 7, 1992, now U.S. Pat. No. 5,303,085.

This invention relates to visual displays which preferably can combine generated images with a view of the environment surrounding a user and transmit such combined visual information to the eye of the user.

BACKGROUND OF THE INVENTION

It is often desirable to provide visual information to a living being. Frequently, one wishes to superimpose such visual information upon the being's view of the real world. In other applications, it is desired to shield the user from a view of the environment, providing an exclusive view of the visual information.

Such displays include a number of components including, in a form known as a folded catadioptric head-mounted display, an image generator, a beam splitting fold mirror which receives the image light from the image generator, often via a series of lenses or other optical elements, and sends a fraction, designated the reflected fraction, of such image light to a reflective combiner that is either non-transmissive or both allows light from the real world to pass through such combiner and reflects the image light such that both the real-world light and the image light are transmitted through the beam splitter to the eye of the user, often via another series of lenses or other optical elements. The beam splitter will transmit a fraction, designated the transmitted fraction, of the image light reflected from the combiner. In embodiments in which the combiner is at least partially transmissive, a fraction of the real-world light is also transmitted by the beam splitter.

Previous devices included a number of additional components. Some devices have included corrective optical elements. Other devices have included a depixelator, e.g., as described in PCT/US94/01390 filed Feb. 7, 1994 for "Depixelated Visual Display" (incorporated herein by reference). Still other devices have included apparatus for intensifying the visual display such as those described in PCT/US94/01391, filed Feb. 7, 1994 for "Intensified Visual Display" (incorporated herein by reference).

In general, there are certain disadvantages to including components other than an image generator, beam splitter and reflective combiner. In most cases, each such additional item will contribute to the increased weight of the display device. When the display device is intended to be mounted on the user's head, such additional weight can contribute to discomfort and detract from the ability to move the head quickly and naturally as is desired for virtual reality applications. Furthermore, such additional devices typically must be correctly and precisely aligned and the difficulty and burden of alignment, both during the original manufacture and during any repair or maintenance that may be needed, is compounded by the number of additional components which are included in the device. Furthermore, both the optical design and the mechanical design become complicated when such additional components are included. Moreover, additional components typically increase the cost of the final device.

Accordingly, it would be useful to provide a visual display apparatus which has a reduced or minimized number of components and yet provides a visual display transmitted to the eye of the user having a desirably high quality and intensity of image.

SUMMARY OF THE INVENTION

One embodiment of the invention is a head-mounted display (HMD) that can project an image from an image generator such as a cathode ray tube (CRT) or a liquid crystal display (LCD) to one of each of the eyes of the observer or both transmit such an image and combine it with a direct view of the surrounding environment. The combiner images a CRT or LCD display surface mounted above the eye with a simple metallic, dielectric or holographic fold mirror reflecting the image towards the combiner.

According to one aspect of the present invention, the device simplifies the imaging optics by reducing the number of elements to three or fewer. One embodiment of the invention consists of an image generator such as a CRT or LCD, a combiner such as a spherical metallic, dielectric or holographically made combiner or collimator-combiner and a fold mirror such as a metallic, dielectric or holographically made fold mirror.

In one embodiment, no additional optical elements are needed to achieve the desired high quality image. Preferably, the visual display is simplified and made lightweight and less expensive by eliminating the need for certain optic elements such as relay lenses or additional corrective refractive optics. In one embodiment, a visual display provides for monochromatic and/or three-color display without refractive optics, such as by using reflective imaging optics only. In another embodiment, a single additional optical element is provided. In one embodiment, the additional optical element is provided to accommodate the curved reflecting surface of the combiner and provide an essentially flat focal field to the user. In another embodiment, a depixelator and/or an image intensifier can be provided.

DETAILED DESCRIPTION OF THE PREFERRED EMBODIMENT

Figure 1:
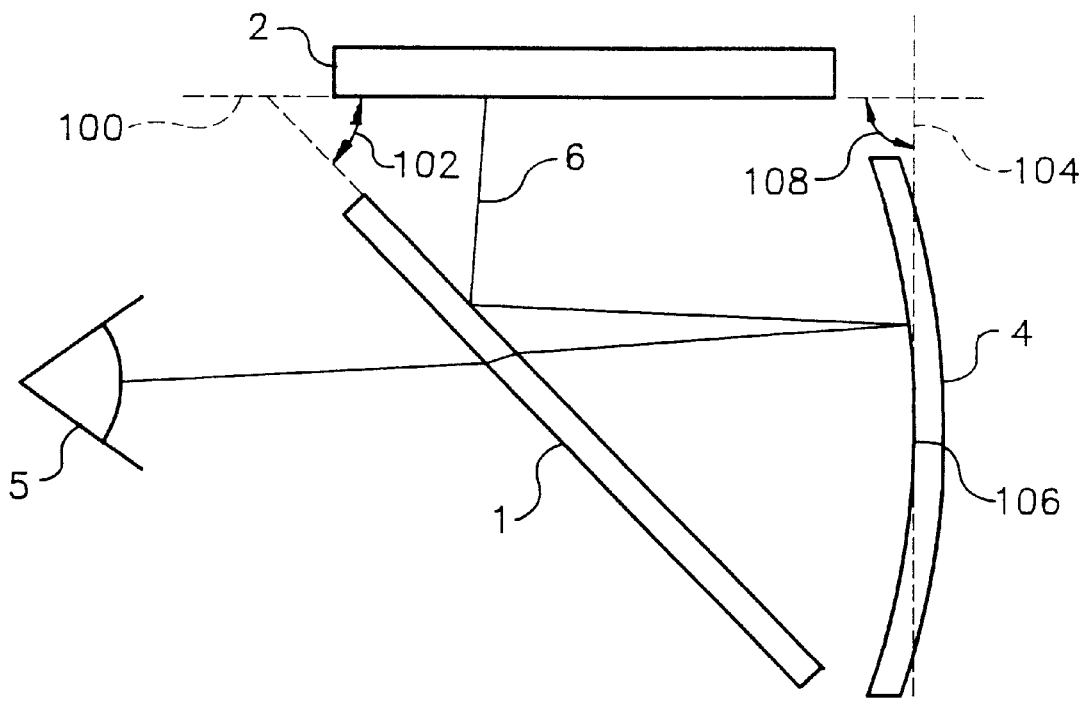
FIG. 1 is a side elevational schematic view of a visual display device according to one embodiment of the present invention.

An embodiment of the visual display comprises, as shown in FIG. 1, an image generator 2, a fold mirror 1 positioned to receive the image light from the image generator 2 and to reflect such image light and a reflective combiner 4 situated to receive the image light from the fold mirror 1, reflect such image light, which may be combined with light rays transmitted through the reflective combiner 4 from the ambient environment and transmit the combined environmental light rays and image light through the fold mirror 1 to the eye 5 of the user. An optical path 6 of the image light from the image generator 2 to the eye 5 is depicted in FIG. 1. Preferably the present invention provides a substantially on-axis configuration. In the on-axis configuration of an embodiment of the present invention, the image light from the image generator impinges the fold mirror at an angle 102 of about 45° (preferably, plus or minus about 5°) and/or the tangent plane 104 at the centroid 106 of the combiner 4 is at an angle 108 of about 90° (preferably, plus or minus about 5°) with respect to the output plane 100 of the image generator 2. An on-axis system avoids a keystone distortion in the image (and thus avoids the requirement for additional optics if the distortion is to be corrected). In one embodiment, the image light passes substantially directly (i.e., without passing through a intervening optical element) from the image generator to the fold mirror and/or from the fold mirror to the combiner.

Figure 2:
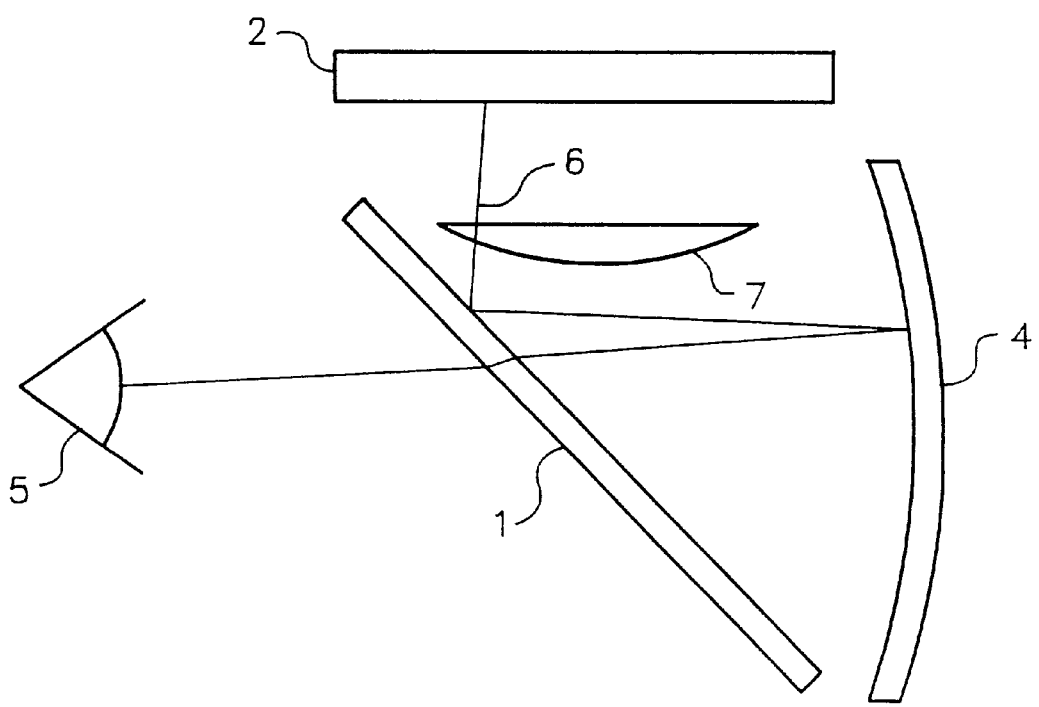
FIG. 2 is a side elevational schematic view of a visual display according to one embodiment of the present invention.

An embodiment illustrated in FIG. 2, includes an optical element, such as a field curvature correction lens 7, placed between the image generator 2 and fold mirror 1. In the depiction of FIG. 2, the lens 7 is a plano-convex lens with its flat surface oriented toward the image plane of the image generator. The various components of the depicted embodiments will be described below in greater detail. Preferably, separate images are generated and transmitted to each eye of the, user so that, in one embodiment, there will be two sets of components, depicted in the FIGS. 1 or 2, one for each eye.

The image generator 2 can be any of a plurality of imagining devices including a cathode-ray tube (CRT), light emitting diode (LED) array, liquid crystal display (LCD), field emissive device (FED), monochrome image source such as a monochrome CRT, which may be used in connection with a liquid crystal color shutter, as well as laser devices such as laser diode arrays. Preferably, an LCD device includes the capability for being backlit using any of a number of backlighting devices (not shown) such as incandescent lighting, fluorescent lighting, electroluminescent and ambient lighting. The image generator can be a monochrome or color image source. In one embodiment, a colorization element such as a liquid crystal color shutter can be used, e.g., to convert a monochrome image into a frame sequential color image. A color shutter system is provided, for example, in Tektronix EX100HD 1 inch Color Display System. In one embodiment, a color LCD such as the Seiko Epson FO7KM200, 138,000 pixel, 0.7" diagonal, backlit LCD can be used, although other devices are also operable. The image generator 2 generates an image under control of an image source 10 communicating with the image generator over a communication link 12. The image generator can receive image information from sources such as a computer, video cassette recorder (VCR), laser disc, video camera and the like. The communication link can be a cable, optical fiber or can be a wireless link, such as an infrared or a radio communication link. In one embodiment, the image generator 2 receives image information from a portable computer, running 3-dimensionally displayed software communicating over a cable link.

In the depicted embodiment, the image generator 2 is mounted substantially above the fold mirror 1 (meaning vertically above, when the device is oriented so that the axis between the eye position 5 and combiner 4 is substantially horizontal). With reference to this configuration, the image light travels downward from the image generator 2 towards the fold mirror 1. The image light is at least partially reflected by the fold mirror 1 in a substantially horizontal direction away from the eye of the user 5 and towards the combiner 4. At the combiner 4, the image light is at least partially reflected back towards the fold mirror 1. In an embodiment in which the user will simultaneously view the image or the environmental light, light from the environment passes through the substantially transparent combiner 4 and travels along with the image light reflected from the combiner 4 to produce combined light. In an embodiment in which the user will view only the generated image, without being able to view the environment (referred to as an "immersive" device), the combiner is substantially fully reflective and substantially non-transmissive (so that, in this context, "combiner" is used only for convenience). The image light and/or the combined light is at least partially transmitted through the fold mirror 1 towards the eye of the user 5. The amount of light, if any, which passes from the surrounding environment to the eyes of the observer can be at least partially controlled by the coatings placed on the surfaces of the combiner and the fold mirror.

A number of technologies can be used to form the fold mirror 1 and the combiner 4. In some devices, holographic optical elements (HOEs) can be used to make the fold mirror and/or the combiner. Various holographic and non-holographic techniques can be used for these purposes, as described more fully below and, as described, for example, in U.S. patent application 08/150,966 filed Nov. 12, 1993 for "Optically Corrected Helmet Mounted Display" and the parent application thereof, Ser. No. 07/832,237, filed Feb. 7, 1992, now U.S. Pat. No. 5,303,085, both of which are incorporated herein by reference.

The fold mirror 1 is a flat, partial reflector. In the depicted embodiment, it is positioned at approximately 45° with respect to the optical path of the image light 6. The fold mirror reflects the projected image from the image source in a direction away from the eye 5 and towards the combiner. The fold mirror also allows at least a portion of the light reflected from the combiner to pass through the fold mirror to the eye.

Preferably, the fold mirror is configured to reflect light evenly across the visible spectrum, (approximately 450 to 650 nanometer wavelengths). In one embodiment, the fold mirror is a 50% splitter (reflecting 50% of light and passing 50% of light). It can be made holographically, dielectrically or metallically. The fold mirror can be formed using glass or plastic substrates, as well as other substantially transparent materials such as crystalline material, polycrystalline material, transparent ceramics and the like. The surface of the fold mirror which faces the image generator is, typically, the reflective surface. The surface which is opposite the reflective surface preferably has an anti-reflective coating. The anti-reflective coating is useful in preventing a ghosting reflection from that surface. Holographic and dielectric fold mirrors can be made to selectively reflect different polarizations at higher rates, and when used with wave retardation materials can achieve very high throughput efficiencies, such as described in patent application PCT/US94/01391.

In one embodiment, the fold mirror cap be produced either from vapor deposition of metallic or dielectric materials on the reflective side, and an anti-reflective coating such as Magnesium Fluoride using the same vapor deposition process. It can also be manufactured using holographic photopolymers or dichromatic gelatin (DCG) for the reflective surface. The anti-reflective surface is vapor deposited onto the back surface of the fold mirror.

The combiner 4 is a fully or partially reflective optical element. In one embodiment, it is spherically or aspherically curved preferably having a radius of curvature between about 50 mm and about 80 mm, more preferably between about 55 mm and about 70 mm and most preferably about 67 mm. Preferably, the combiner 4 serves as the primary magnification element for the image light. An optical element is referred to as being a "powered" element if it provides image magnification. Although, for convenience, this item is referred to as a "combiner", in some embodiments the combiner may be used without providing for a combination of image light with environmental light, as described more fully below. The combiner can be formed on a substrate of glass, plastic, or other transparent or partially transparent material or, when isolation from environmental light is desired, from opaque or substantially opaque substrates such as metal, non-transparent ceramics, plastics or glass and the like.

In one embodiment, the combiner can be made holographically using photopolymers, dichromated gelatin (DCG) or other similar holographic materials. As is well known in the art, holographic elements can be finely tuned to reflect specific bands of wavelengths and transmit other wavelengths. In one embodiment, the combiner is tuned to achieve high reflection of red, green and blue wavelengths which are the wavelengths output by the image generator (and which, when combined, produce full color images). In one embodiment, the holographic combiner is a single line or multi-line holographic device, which can be tuned to reflect one or more wavelengths. For example, a three-line holographic device can be tuned to reflect wavelengths of, e.g., approximately 480, 545 and 630 nanometers (plus or minus about 20 nanometers). Other wavelengths, such as wavelengths from the environment other than those in a narrow range around 480, 545 and 630 nanometers, will be transmitted through the combiner, towards the eye of the user with a high degree of transmissivity. Depending on the application, the hologram can be configured to reflect more, fewer or different wavelengths. Although digital holography is an operable technique, it is currently believed that this technique, which can be expensive to implement, is not needed to achieve the high-quality image of the present invention, and accordingly, a traditional (non-digital or non-synthetic) technique is presently preferred, when holograms are to be used for the combiner.

Combiner can also be made using broadband dielectric technology. These combiners are made through the deposition of successive layers of dielectric material such as silicon dioxide and titanium dioxide. This type of coating can be provided so as to evenly reflect across the visible spectrum, such as evenly reflecting wavelengths between approximately 450 nanometers and 650 nanometers. Such evenness of reflection is particularly useful in maintaining color integrity of the image. Combiners made with a broadband dielectric coating are less efficient and less transmissive than holographic combiners and thus are useful in applications where high transmissivity is not required (such as virtual reality applications in which environmental light is not desired). Fully or almost fully immersive dielectric combiners can be made by dipping the combiner substrate into a light absorbing dye. The dying process can be altered to produce combiners of a given desired transmissivity specification, for example, about 1%.

A combiner can also be formed on a substrate using an aluminum or other metallic coating in order to achieve the desired reflectivity of the combiner. These materials are relatively inexpensive compared with holographic or dielectric combiners but are not as efficient. These combiners are easily made to be fully immersive and, by decreasing the thickness of the coating, can be made to be transmissive as well.

In one embodiment, the magnification provided by the combiner 4 is configured so that center of the image from the image generator appears to the user, to have an infinite focus, (i.e., appears to be in focus to the user when the user is focusing his or her eyes at a far, essentially infinite, distance). In many configurations, portions of the image which are not at the center have a focus, perceived by the user, at some point closer than that at the center of the image. Typically, this difference will increase as one progresses farther from the center of the generated image. In many applications this difference in perceived focal distance is undesirable since, e.g., it forces the user to constantly shift his or her eye focus when viewing different portions of the generated image.

In some embodiments it may be preferable to accept a certain amount of difference in focal distance across the generated image, e.g., in order to reduce or minimize the total weight of the visual display device, the cost, complexity and the like. In some applications, however, it is desired to include an additional optical element in order to correct this optical characteristic and present the user with a substantially flat focal field for the generated image. Embodiments of the invention can be used to reduce the aberrations and distortions produced by the spherical combiner such as image field curvature. The embodiment of FIG. 2 depicts one approach for achieving this correction. In these embodiments, additional optical element 7 is positioned somewhere along the optical path between the image generator and the eye of the user. In the embodiment of FIG. 2, it is placed between the image generator 2 and the fold mirror 1. In the embodiment depicted in FIG. 2, the additional optical element is a plano-convex (PCX) lens.

In another embodiment, a meniscus lens, e.g., a negative meniscus lens can be used to simultaneously correct field curvature and to aim the image light in a more favorable direction. Aiming the image light can be useful for a number of purposes, including maintaining high contrast images, as described below. Image rays exiting from the image generator near normal (90°± about 10° with respect to the image plane) often have the highest contrast ratio.

Figure 5A:
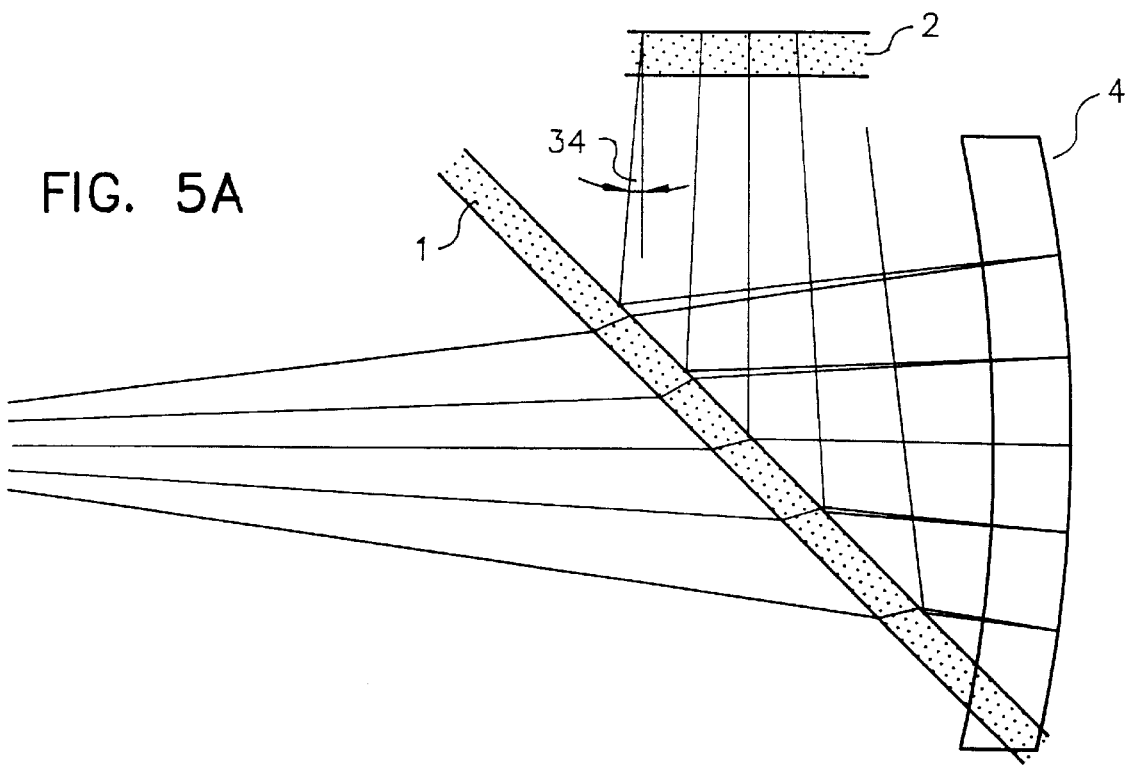
FIGS. 5A and 5B are side schematic views showing effective viewing angles in the absence of contrast correction.
Figure 5B:
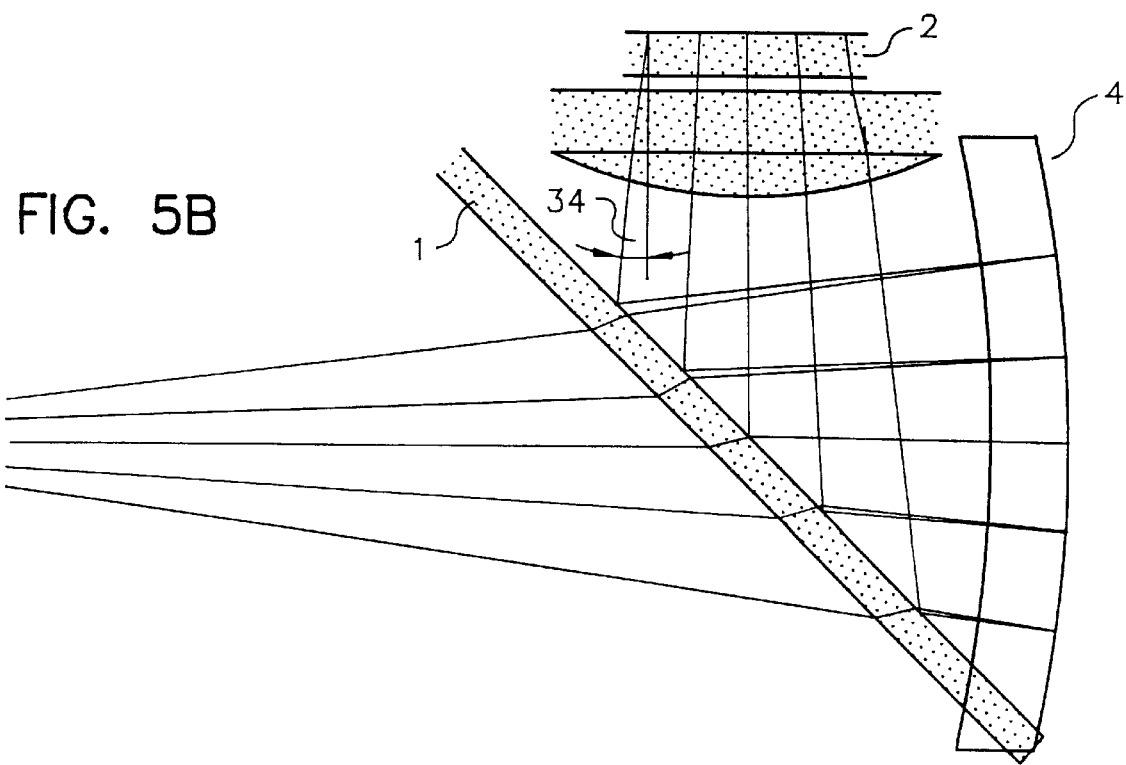

As depicted in FIG. 5A, in configurations which include only an image generator 2, fold mirror 1 and combiner 4, while the effective viewing angle 32 near the center of the image will be relatively close to normal (i.e., 90° to the image output plane), typically departing therefrom by no more than about 10°. However, portions of the image generated near the edges of the image generator 2 have an effective viewing angle 34 which is larger, and, in many cases, will be large enough (such as about 10° or more from normal) to have a degenerated or even reverse contrast. This typically presents the greatest problem when the image generator 2 is a liquid crystal display since LCDs are often subject to loss of contrast at high viewing angles. This manifests itself in a perception of a low contrast or a reverse contrast image near the periphery or edge of the image. The problem of loss of contrast near the edge of the image is even more acute when a plano-convex lens 7 is included as depicted in FIG. 5B or when the image generator 2 has a relatively larger size such as having a diagonal size of 1 inch or more (although some loss of contrast of the periphery may still occur for smaller image generators such as 0.7 inch diagonal image generators).

Figure 6:
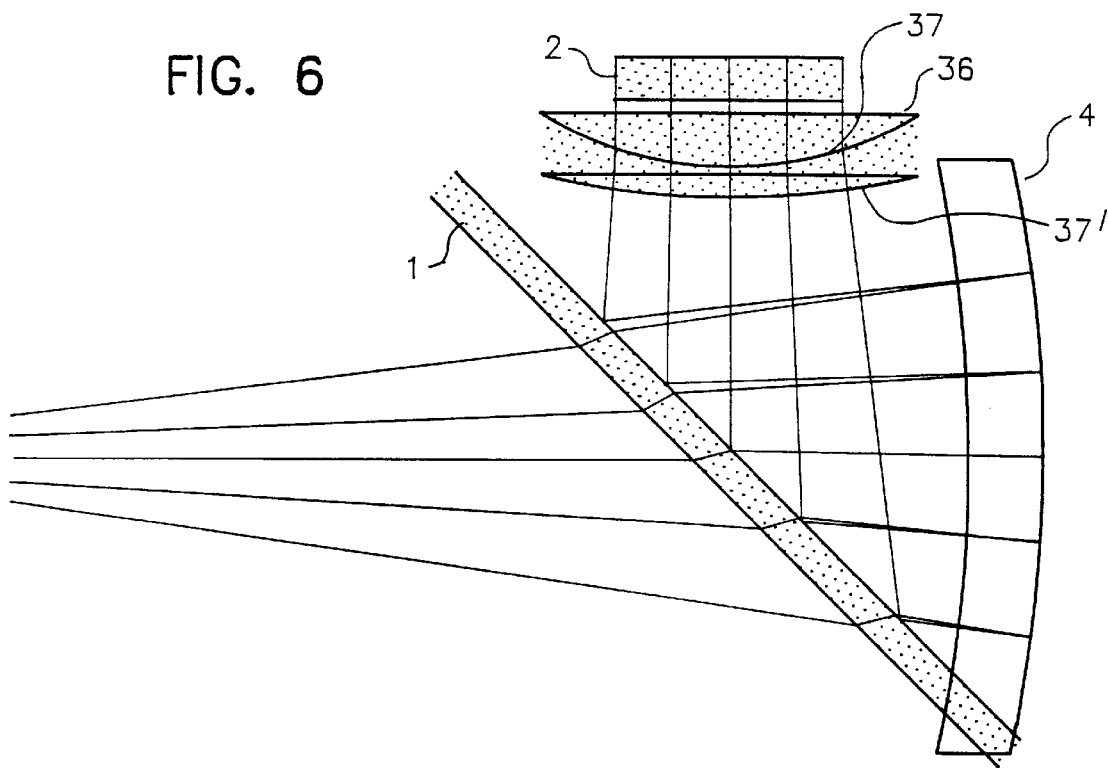
FIG. 6 is a side schematic view showing corrected viewing angles.

According to one embodiment of the present invention, loss of contrast can be reduced or eliminated by providing an optical element which accepts light rays at normal incidence from the LCD and redirects the light so as to enter the field curvature correction lens (where present) at the required angles and so as to produce the desired magnification and/or field curvature correction. FIG. 6 depicts one such apparatus which provides a negative meniscus lens 36, preferably adjacent and/or contacting the output plane of the image generator 2. Preferably, the negative meniscus lens is formed by an upper surface 37 of device 36 while a lower surface 37' acts as the field curvature correction lens. As can be seen from FIG. 6 the effect of the negative meniscus lens is to provide an effective viewing angle for all portions of the image generated by the image generator 2 which is a relatively low angle (with respect to the normal direction from the output plane of the image generator) such as less than about 10°, preferably less than about 5° and more preferably less than about 3° from normal. Other optical elements which can achieve this manipulation are diffractive optical elements (DOEs), fresnel lenses and other refractive optical elements. When a diffractive optical element is used it can be placed directly on the LCD surface or on the field curvature correction lens or on a separate element, e.g., located between the image generator 2 and the field curvature correction lens. Such a diffractive optical element would receive light rays at normal incidence from the image generator 2 and redirect the rays through diffraction, to the proper angles required by the plano-convex lens 7 used for field curvature correction.

Aiming the image rays is achieved using a diffractive optical element (such as a zone plate or hologram) or a Fresnel optic acting as a negative lens to accept collimated light, at substantially normal incidence from the image source, redirect it into a divergent beam which is then recollimated by the field curvature correction lens.

Figure 3:
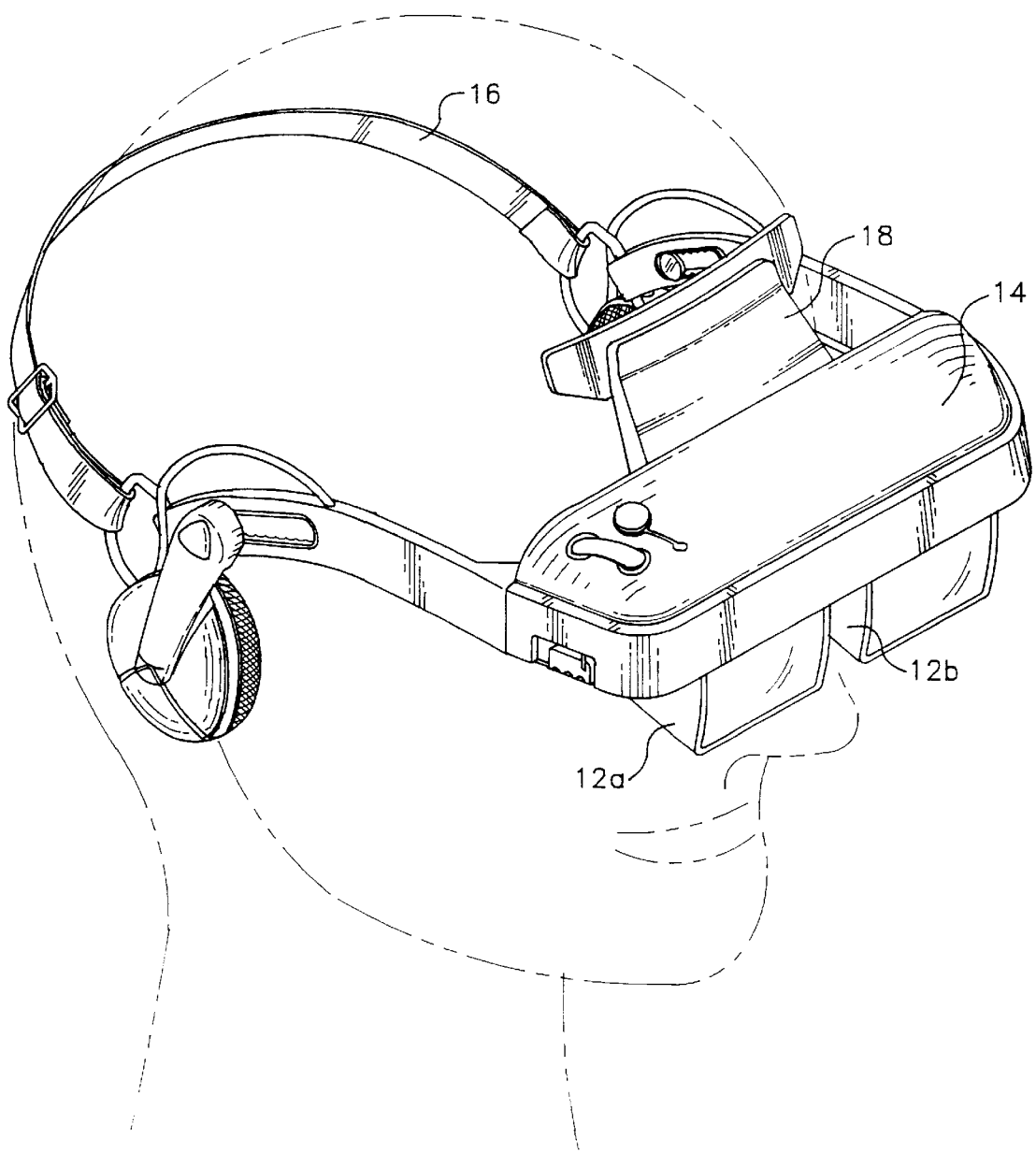
FIG. 3 is a perspective view, showing a head-mounted display device according to one embodiment of the present invention.
Figure 4:
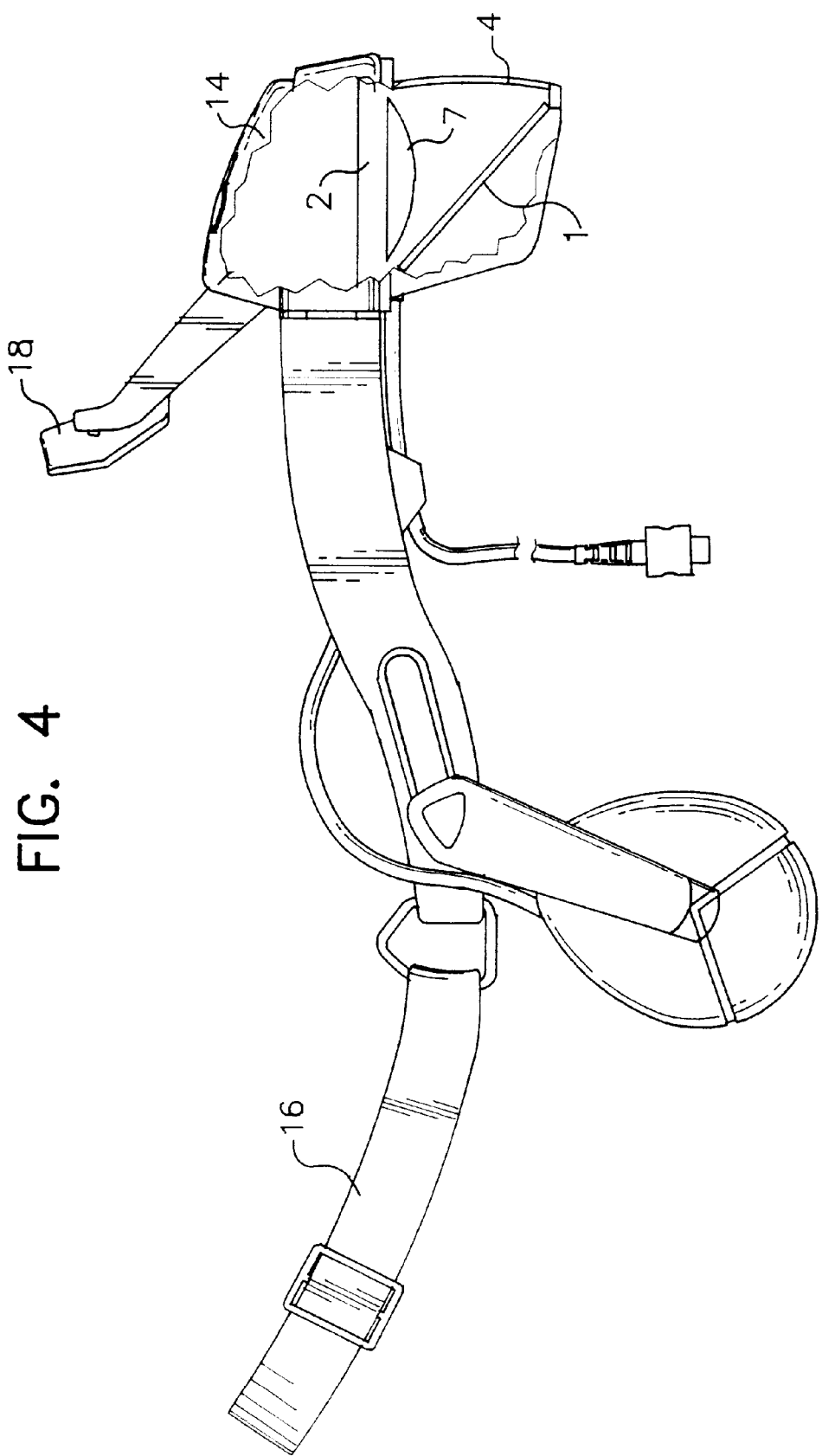
FIG. 4 is a side view, partially cut away, showing a head-mounted display device according to one embodiment of the present invention.

FIGS. 3 and 4 depict the use of the elements of FIG. 2 in a head mounted display. In one embodiment, the optics are fully or partially protected by being enclosed in a shroud 12, preferably with separate shrouds 12a and 12b for each eye as described in PCT application PCT/US94/09819 for Personal Visual Display System, filed on an even date herewith and incorporated herein by reference. A covering such as visor top 14 further shields from stray light and protects the optical elements from dust or other contamination. In the depicted embodiment, the device is held in position by strap 16 and a forehead brace 18.

In view of the above description, a number of advantages of the present invention can be seen. The present invention provides for a high quality visual display which can combine a generated image with environmental light, but which is nevertheless lightweight and of reduced complexity and cost. In one embodiment, the generated image is magnified but is also presented to the user with a substantially flat focal field.

A number of variations and modifications can also be used. Although the invention provides for high quality image and a lightweight device at least partially by reducing or minimizing the number of components, certain additional optical components can be used if desired such as image intensifiers, depixelators and diffractive optical elements and Fresnel optics.

When a depixelator is used, it can be provided as a crossed diffraction grating located parallel to the pixel plane of an image generator to receive, diffract, and transmit and thereby depixelate the light image from the image generator. Preferably, the spatial frequency of the crossed diffraction grating is constructed such that this spatial frequency multiplied by the shortest wavelength of the image light that is used approximately equals the center-to-center distance between adjacent pixels in the pixel plane of the image generator divided by twice the optical distance between the crossed diffraction grating and the pixel plane of the image generator.

It is preferable that the modulation depth of the crossed diffraction grating fall within the range of 80% to 120% and that the crossed diffraction grating be sinusoidal or slightly squared.

When the additional optical component is an image intensifier, the intensifier can be provided as follows. If the light from the image generator is S polarized, a phase retarder, such as a quarter-wave plate or a polarization rotator, such as a liquid crystal device is positioned so that the S polarized image light reflected from the fold mirror is transmitted through e.g., a quarter-wave plate and retarded by one-quarter wave in order to exit the quarter-wave plate as circularly polarized image light. The reflective combiner is situated to receive the circularly polarized image light from the quarter-wave plate, reflect such circularly polarized image light, combine such circularly polarized image light with light rays transmitted through said reflective combiner from the surrounding environment, and transmit the combined environmental light rays and circularly polarized image light through the quarter-wave plate, which again retards the circularly polarized image light by one-quarter wave so that it exits the quarter-wave plate as P polarized light which then passes through the fold mirror with the environmental light rays and subsequently reaches the eye position of the user, as also do the environmental light rays with which the image light has been combined. Optionally, the quarter-wave plate is attached to the reflective combiner.

The precise nature of the quarter-wave plate is not critical. It is, however, preferable to employ a single-order plate so that dependence on angle and wavelength is minimized. Quarter-wave plates are made from plastics and crystals or constructed holographically. A plastic wave plate is, however, more dispersive, and has lower optical properties than a crystalline or holographic wave plate.

If the light from the image generator is P polarized, the user-mounted display comprises a first phase retarder such as a quarter-wave plate or a polarization rotator, located so that the P polarized image light from an image generator is transmitted through said first quarter-wave plate and retarded by one-quarter wave in order to exit the first quarter-wave plate as circularly polarized image light; a second quarter-wave plate positioned so that the circularly polarized image light from the first quarter-wave plate is transmitted through said second quarter-wave plate and retarded by one quarter-wave in order to exit the second quarter-wave plate as S polarized image light. The fold mirror receives the S polarized image light from the second quarter-wave plate and reflects such S polarized image light through the second quarter-wave plate where the S polarized image light will again be retarded by one-quarter wave and, consequently, exit said second quarter-wave plate as circularly polarized image light. The reflective combiner receives the circularly polarized image light from the second quarter-wave plate, reflects such circularly polarized image light, combines such circularly polarized image light, combines such circularly polarized image light with light rays transmitted through the combiner from the surrounding environment, and transmits the combined environmental light rays and circularly polarized image light through the second quarter-wave plate, which again retards the circularly polarized image light by one-quarter wave so that it exits the second quarter-wave plate as P polarized image light which then passes through the fold mirror with the environmental light rays and subsequently reaches the eye position of the user, as also do the environmental light rays with which the image light has been combined.

The second quarter-wave plate can optionally be laminated to the fold mirror. This has the advantage of reducing the number of components which must be optically aligned. Additionally, it creates fewer surfaces on which an anti-reflective coating must be placed.

Although the depicted configuration is an on-axis system, the present invention can also be used in connection with an off-axis system. Although the depicted embodiment involves a binocular or biocular configuration a monocular configuration can also be used. Although the depicted embodiment shows a head-mounted display, other mounting techniques can be used such as a helmet mounted, fixed-eyepiece displays or the like.

Although the present invention has been described by way of a preferred embodiment and certain variations and modifications, other variations and modifications can also be used, the invention being defined by the following claims.

What is claimed is:

1. Head-mounted visual display apparatus for a user, comprising:
   an image generator which outputs image light, said image generator having a substantially planar output surface to output said image light in an image plane, said planar output surface being non-orthogonal to the plane of the user's eyes, wherein wavelengths of said image light are from approximately 480 nanometers to approximately 630 nanometers;
   a fold mirror configured to reflect light evenly across the visible spectrum, positioned to receive the image light from the image generator and to reflect at least a first portion of said image light in a first direction;
   a reflective combiner situated to receive said first portion of said image light from said fold mirror, reflect at least a second portion of said image light, combined with environmental light transmitted through the reflective combiner to produce combined light, wherein at least some of said combined light is transmitted through said fold mirror in a second direction to the eye position of the user, providing an optical path from said image generator to said fold mirror to said combiner, back through said fold mirror and to said eye position of the user;
   said image generator and said reflective combiner being mounted on the head of said user at a level below the top of the head of said user;
   wherein said visual display apparatus is provided in the absence of any optically active components between said image generator and said fold mirror.

2. An apparatus, as claimed in claim 1, wherein said image light includes red, green and blue light.

3. Head-mounted visual display apparatus for a user, comprising:
   an image generator which outputs image light, said image generator having a substantially planar output surface to output said image light in an image plane, said planar output surface being non-orthogonal to the plane of the user's eyes;
   a fold mirror configured to reflect light evenly across the visible spectrum, positioned to receive the image light from the image generator and to reflect at least a first portion of said image light in a first direction;
   a reflective combiner situated to receive said first portion of said image light from said fold mirror, reflect at least a second portion of said image light, combined with environmental light transmitted through the reflective combiner to produce combined light, wherein at least some of said combined light is transmitted through said fold mirror in a second direction to the eye position of the user, providing an optical path from said image generator to said fold mirror to said combiner, back through said fold mirror and to said eye position of the user;
   said image generator and said reflective combiner being mounted on the head of said user at a level below the top of the head of said user;
   an optical element, distinct from said combiner and said fold mirror, positioned between said fold mirror and said combiner.

4. Apparatus, as claimed in claim 3, wherein said optical element positioned between said fold mirror and said combiner comprises a phase retarder.

5. An apparatus, as claimed in claim 3, wherein said optical element is positioned for receiving said image light from said image generator prior to said image light contacting said fold mirror.

6. Head-mounted visual display apparatus for a user, comprising:
   an image generator which outputs image light, said image generator having a substantially planar output surface to output said image light in an image plane, said planar output surface being non-orthogonal to the plane of the user's eyes;
   a fold mirror configured to reflect light evenly across the visible spectrum, positioned to receive the image light from the image generator and to reflect at least a first portion of said image light in a first direction;
   a reflective combiner situated to receive said first portion of said image light from said fold mirror, reflect at least a second portion of said image light, combined with environmental light transmitted through the reflective combiner to produce combined light, wherein at least some of said combined light is transmitted through said fold mirror in a second direction to the eye position of the user, providing an optical path from said image generator to said fold mirror to said combiner, back through said fold mirror and to said eye position of the user;
   said image generator and said reflective combiner being mounted on the head of said user at a level below the top of the head of said user;
   a refractive optical element located between said image generator and the fold mirror
   wherein said refractive optical element avoids a reduction in contrast in the image.

7. Head-mounted visual display apparatus for a user, comprising:
   an image generator which outputs image light, said image generator having a substantially planar output surface to output said image light in an image plane, said planar output surface being non-orthogonal to the plane of the user's eyes;
   a fold mirror configured to reflect light evenly across the visible spectrum, positioned to receive the image light from the image generator and to reflect at least a first portion of said image light in a first direction;
   a reflective combiner situated to receive said first portion of said image light from said fold mirror, reflect at least a second portion of said image light, combined with environmental light transmitted through the reflective combiner to produce combined light, wherein at least some of said combined light is transmitted through said fold mirror in a second direction to the eye position of the user, providing an optical path from said image generator to said fold mirror to said combiner, back through said fold mirror and to said eye position of the user;

said image generator and said reflective combiner being mounted on the head of said user at a level below the top of the head of said user;

wherein one of a phase retarder and a polarization rotating device is positioned along the optical path.

8. Apparatus, as claimed in claim 7, wherein said phase retarder is a quarter-wave plate.

9. Head-mounted visual display apparatus for a user, comprising:

an image generator which outputs image light, said image generator having a substantially planar output surface to output said image light in an image plane, said planar output surface being non-orthogonal to the plane of the user's eyes;

a fold mirror configured to reflect light evenly across the visible spectrum positioned to receive the image light from the image generator and to reflect at least a first portion of said image light in a first direction;

a second mirror situated to receive said first portion of said image light from said fold mirror, reflect at least a second portion of said image light, wherein at least some of said image light is transmitted through said fold mirror in a second direction to the eve position of the user, providing an optical path from said image generator to said fold mirror to said second mirror to said eve position of the user;

said image generator and said second mirror being mounted on the head of said user at a level below the top of the head of said user;

wherein said second mirror is substantially non-transmissive.

10. Visual display apparatus for a user, comprising:

an image generator having a first output surface, which outputs image light;

a fold mirror positioned to receive the image light from the image generator and to reflect at least a first portion of said image light in a first reflected direction;

a magnifier situated to receive said first portion of said image light from said fold mirror, reflect and magnify at least a second portion of said image light combined with environmental light transmitted through the magnifier to produce combined light, wherein at least some of said combined light is transmitted through said fold mirror in a second reflected direction to the eye position of the user, providing an optical path from said image generator to said fold mirror to said magnifier to said eye position of the user; and means which redirect light received at normal incidence, for preventing loss of contrast of said image.

11. Head-mounted visual display apparatus for a user, comprising:

an image generator which outputs image light, said image generator having a substantially planar output surface to output said image light in an image plane, said planar output surface being non-orthogonal to the plane of the user's eyes;

a fold mirror configured to reflect light evenly across the visible spectrum, positioned to receive the image light from the image generator and to reflect at least a first portion of said image light in a first direction;

a reflective combiner situated to receive said first portion of said image light from said fold mirror, reflect at least a second portion of said image light, combined with environmental light transmitted through the reflective combiner to produce combined light, wherein at least some of said combined light is transmitted through said fold mirror in a second direction to the eye position of the user, providing an optical path from said image generator to said fold mirror to said combiner, back through said fold mirror and to said eye position of the user;

said image generator and said reflective combiner being mounted on the head of said user at a level below the top of the head of said user;

an optical element positioned between said fold mirror and said combiner, wherein said optical element comprises a phase retarder.

12. Head-mounted visual display apparatus for a user, comprising:

an image generator which outputs image light, said image generator having a substantially planar output surface to output said image light in an image plane, said planar output surface being non-orthogonal to the plane of the user's eyes;

a fold mirror configured to reflect light evenly across the visible spectrum, positioned to receive the image light from the image generator and to reflect at least a first portion of said image light in a first direction;

a reflective combiner situated to receive said first portion of said image light from said fold mirror, reflect at least a second portion of said image light, combined with environmental light transmitted through the reflective combiner to produce combined light, wherein at least some of said combined light is transmitted through said fold mirror in a second direction to the eye position of the user, providing an optical path from said image generator to said fold mirror to said combiner, back through said fold mirror and to said eye position of the user;

said image generator and said reflective combiner being mounted on the head of said user at a level below the top of the head of said user;

wherein at least one of said fold mirror and reflective combiner provides an on-axis configuration for said visual display apparatus.

13. An apparatus, as claimed in claim 12, wherein said on-axis configuration includes one of: (a) said fold mirror being at an angle of approximately 45° to said planar output surface, and (b) said reflective combiner being at an angle of approximately 90° to said planar output surface.

14. Head-mounted visual display apparatus for a user, comprising:

an image generator which outputs image light, said image generator having a substantially planar output surface to output said image light in an image plane, said planar output surface being non-orthogonal to the plane of the user's eyes;

a fold mirror configured to reflect light evenly across the visible spectrum, positioned to receive the image light from the image generator and to reflect at least a first portion of said image light in a first direction;

a reflective combiner situated to receive said first portion of said image light from said fold mirror, reflect at least a second portion of said image light, combined with environmental light transmitted through the reflective combiner to produce combined light, wherein at least some of said combined light is transmitted through said fold mirror in a second direction to the eye position of the user, providing an optical path from said image generator to said fold mirror to said combiner, back through said fold mirror and to said eye position of the user;

said image generator and said reflective combiner being mounted on the head of said user at a level below the top of the head of said user;

said fold mirror and said reflective combiner are used for combining a wavelength of light from said image light with said wavelength of light transmitted through said reflective combiner.

\* \* \* \* \*